United States Patent
Grindling et al.

(10) Patent No.: US 9,546,260 B2
(45) Date of Patent: Jan. 17, 2017

(54) FILLED TWO-COMPONENT CURABLE EPOXY SYSTEM WITH ENHANCED SEDIMENTATION STABILITY

(75) Inventors: Josef Grindling, Aesch (CH); Christian Beisele, Müllheim (DE); Astrid Beigel, Steinen-Höllstein (DE); Cliff Beard, Hegenheim (FR); Ann Beard, legal representative, Hegenheim (FR)

(73) Assignee: Huntsman International LLC, The Woodlands, TX (US)

( * ) Notice: Subject to any disclaimer, the term of this patent is extended or adjusted under 35 U.S.C. 154(b) by 135 days.

(21) Appl. No.: 13/266,467

(22) PCT Filed: Mar. 25, 2010

(86) PCT No.: PCT/EP2010/053874
§ 371 (c)(1),
(2), (4) Date: Oct. 27, 2011

(87) PCT Pub. No.: WO2010/127907
PCT Pub. Date: Nov. 11, 2010

(65) Prior Publication Data
US 2012/0065295 A1    Mar. 15, 2012

(30) Foreign Application Priority Data
May 5, 2009    (EP) .................................... 09159360

(51) Int. Cl.
*C08K 5/1575*    (2006.01)
*C08K 5/205*    (2006.01)
(Continued)

(52) U.S. Cl.
CPC ............... *C08K 5/1575* (2013.01); *C08K 3/22* (2013.01); *C08K 3/26* (2013.01); *C08K 3/28* (2013.01);
(Continued)

(58) Field of Classification Search
USPC .......................... 523/400, 440, 466; 524/779
See application file for complete search history.

(56) References Cited

U.S. PATENT DOCUMENTS 3,914,467 A * 10/1975 Akao et al. .................... 427/116
5,166,229 A * 11/1992 Nakano et al. ................ 523/447
(Continued)

FOREIGN PATENT DOCUMENTS

| EP | 0 211 147 | 2/1987 |
| EP | 0 533 465 | 3/1993 |
| EP | 1 491 566 | 12/2004 |

OTHER PUBLICATIONS

S Balakrishnan, "Characterizing Pharmaceutical Lotions by Rheology," Express Pharma (2006).*
(Continued)

*Primary Examiner* — Mark Kaucher
*Assistant Examiner* — Kregg Brooks (57) ABSTRACT

The present disclosure relates to a curable system comprising at least two compositions (A) and (B) where composition (A) comprises an epoxy resin, an inorganic thixotropic agent, an organic gelling agent and a filler and composition (B) comprises a hardener, an inorganic thixotropic agent, an organic thixotropic agent and filler. The curable system may be used in the manufacture of components or parts of electrical equipment.

10 Claims, 4 Drawing Sheets

(51) Int. Cl.
*C08L 63/00* (2006.01)
*C08K 3/22* (2006.01)
*C08K 3/36* (2006.01)
*C08K 3/26* (2006.01)
*C08K 3/28* (2006.01)
*C08K 13/02* (2006.01)
*C08K 3/30* (2006.01)

(52) U.S. Cl.
CPC . *C08K 3/30* (2013.01); *C08K 3/36* (2013.01); *C08K 5/205* (2013.01); *C08K 13/02* (2013.01); *C08L 63/00* (2013.01)

(56) References Cited

U.S. PATENT DOCUMENTS

| | | | |
|---|---|---|---|
| 5,616,633 A * | 4/1997 | Wombwell et al. | 523/400 |
| 5,906,784 A | 5/1999 | Weidmann | |
| 6,140,387 A * | 10/2000 | Gerst | 522/79 |
| 6,503,960 B1 * | 1/2003 | Kadziela et al. | 522/78 |
| 6,565,835 B1 * | 5/2003 | Socci et al. | 424/61 |
| 6,638,567 B1 * | 10/2003 | Beisele | 427/116 |
| 6,870,024 B2 * | 3/2005 | Haubennestel et al. | 528/49 |
| 8,026,307 B2 * | 9/2011 | Miller | 524/437 |
| 8,088,862 B2 * | 1/2012 | Reimann et al. | 524/590 |
| 2004/0161286 A1 * | 8/2004 | Omatsu et al. | 401/141 |
| 2007/0072981 A1 * | 3/2007 | Miller | 524/445 |

OTHER PUBLICATIONS

International Search Report regarding corresponding application No. PCT/EP2010/053874, dated May 21, 2010.

* cited by examiner

FILLED TWO-COMPONENT CURABLE EPOXY SYSTEM WITH ENHANCED SEDIMENTATION STABILITY

CROSS REFERENCE TO RELATED APPLICATIONS

This application is the National Phase of International Application PCT/EP2010/053874 filed Mar. 25, 2010 which designated the U.S. and which claims priority to European Patent Application (EP) 09159360.8, filed May 5, 2009. The noted application is incorporated herein by reference.

FIELD OF THE INVENTION

The present invention relates to a curable system comprising at least two compositions (A) and (B), a method for the manufacturing of a cured product as well as cured products obtainable by the method. Further, the present invention relates to the use of the cured products as electrical insulator as well as the use of the curable system for the manufacture of components or parts of electrical equipment.

BACKGROUND OF THE INVENTION

A typical process for making cast resin epoxy insulators is the automatic pressure gelation process (APG process). The APG process requires that before injecting the reactive mixture into a hot mold the curable system comprising the epoxy resin composition (composition A) as well as the composition comprising the hardener for the epoxy resin (composition B) have to be prepared to be ready for injection.

In ease of pre-filled systems, i.e. a system having compositions which comprise a filler, the composition must be stirred up in the delivery container due to the sedimentation of the filler in the composition. Typically, in order to obtain a homogeneous formulation the filler containing composition has to be heated up and stirred. After homogenization of each composition of the curable system the compositions are combined and transferred into a mixer and mixed at elevated temperature and a reduced pressure in order to degas the formulation. The degassed mixture is subsequently injected into the hot mold.

In case of non-pre-filled systems the epoxy resin composition and the hardener composition are typically mixed individually with the filler and optionally further additives at elevated temperature and reduced pressure to prepare the pre-mixture for the resin and the hardener. In a further step the two compositions are combined to form the final reactive mixture, typically by mixing at elevated temperature and reduced pressure. Subsequently, the degassed mixture is injected into the mold.

However, the APG process known in the prior art requires several steps, i.e. at least a stirring step in order to avoid the sedimentation of the filler and additionally a degassing step.

In the field of silicone process technology curable systems are where two compositions are pumped at ambient temperature out of the respective delivery containers without degassing or prestirring through a static mixer into a mold. The mixing and dosing equipment is sufficient to fulfil the requirements to process the two compositions in order to prepare a reactive mixture which can be injected into a mold. Depending on the size of the article to be prepared the respective volume is injected through a static mixer into the mold.

The basic design of all silicone injection systems is composed of a base frame to hold the different compositions. The compositions can be stored in commercially available drums. A hydraulic control ensures a synchronous operation of the dosing pumps.

The existing curing systems cannot be applied to the "silicone processes".

SUMMARY OF THE INVENTION

It was an object of the present invention to adapt a curing system on basis of epoxy resins to the "silicone process". This requires, however, a curing system wherein each of the compositions is sedimentation stable, i.e. the filler is stabilized against sedimentation and, a good flowability has to be maintained once the compositions are combined. Especially a good flowability after injection to the hot mold has to be maintained.

It was an object of the present invention to overcome the problems associated with the process technology disclosed in the prior art. Further, it was an object to provide a curable system which can be applied to a method for the manufacturing of cured epoxy articles in a more economic and advantage manner.

DETAILED DESCRIPTION OF THE INVENTION

It has now surprisingly been found that the above-mentioned problems can be solved by a curable system comprising a specific combination of at least two compositions.

The first embodiment of the present invention is a curable system comprising at least two compositions (A) and (B) wherein composition (A) comprises:
- a-1) at least one epoxy resin,
- a-2) at least one inorganic thixotropic agent selected from the group consisting of fumed metal oxides, fumed semi-metal oxides and layered silicates,
- a-3) at least one organic gelling agent and
- a-4) at least 10 wt.-% of one or more filler, wherein the weight is based on the total weight of composition (A);

and wherein composition (B) comprises:
b-1) at least one hardener for epoxy resins,
b-2) at least one inorganic thixotropic agent selected from the group consisting of fumed metal oxides, fumed semi-metal oxides and layered silicates,
b-3) at least one organic thixotropic agent selected from carbamates and
b-4) at least 10 wt.-% of one or more filler, wherein the weight is based on the total weight of composition (B).

Composition (A) of the curable system according to the present invention comprises at least one epoxy resin. Epoxy resin suitable as component a-1) are those customary in epoxy resin technology. Examples of epoxy resins are:

I) Polyglycidyl and poly(β-methylglyeidyl)esters, obtainable by reaction of a compound having at least two carboxyl groups in the molecule with epichlorohydrin and β-methylepichlorohydrin, respectively. The reaction is advantageously performed in the presence of bases.

Aliphatic polycarboxylic acids may be used as the compound having at least two carboxyl groups in the molecule. Examples of such polycarboxylic acids are oxalic acid, succinic acid, glutaric acid, adipic acid, pimelic acid, suberic acid, azelaic acid or dimerised or trimerised linoleic acid.

It is also possible, however, to use cycloaliphatic polycarboxylic acids, for example hexahydrophthalic acid or 4-methylhexahydrophthalic acid.

Aromatic polycarboxylic acids, for example phthalic acid, isophthalic acid or terephthalic acid, may also be used as well as partly hydrogenated aromatic polycarboxylic acids such as tetrahydrophthalic acid or 4-methyltetrahydrophthalic acid.

II) Polyglycidyl or poly(β-methylglycidyl)ethers, obtainable by reaction of a compound having at least two free alcoholic hydroxy groups and/or phenolic hydroxy groups with epichlorohydrin or β-methylepichlorohydrin under alkaline conditions or in the presence of an acid catalyst with subsequent alkali treatment.

The glycidyl ethers of this kind are derived, for example, from acyclic alcohols, e.g. from ethylene glycol, diethylene glycol or higher poly(oxyethylene)glycols, propane-1,2-diol or poly(oxypropylene)glycols, propane-1,3-diol, butane-1,4-diol, poly(oxytetramethylene)glycols, pentane-1,5-diol, hexane-1,6-diol, hexane-2,4,6-triol, glycerol, 1,1,1-trimethylol-propane, pentaerythritol, sorbitol, and also from poly-epichlorohydrins.

Further glycidyl ethers of this kind are derived from cycloaliphatic alcohols, such as 1,4-cyclohexanedimethanol, bis(4-hydroxycyclohexyl)methane or 2,2-bis(4-hydroxycyclo-hexyl)propane, or from alcohols that contain aromatic groups and/or further functional groups, such as N,N-bis(2-hydroxyethyl)aniline or p,p'-bis(2-hydroxyethylamino)diphenyl-methane. The glycidyl ethers can also be based on mononuclear phenols, for example resorcinol or hydroquinone, or on polynuclear phenols, for example bis(4-hydroxyphenyl)methane, 4,4'-dihydroxybiphenyl, bis(4-hydroxyphenyl)sulfone, 1,1,2,2-tetrakis(4-hydroxyphenyl)ethane, 2,2-bis(4-hydroxyphenyl)propane or 2,2-bis(3,5-dibromo-4-hydroxyphenyl)propane.

Further hydroxy compounds that are suitable for the preparation of glycidyl ethers are novolaks, obtainable by condensation of aldehydes, such as formaldehyde, acetaldehyde, chloral or furfuraldehyde, with phenols or bisphenols that are unsubstituted or substituted by chlorine atoms or by $C_1$-$C_9$alkyl groups, e.g. phenol, 4-chlorophenol, 2-methylphenol or 4-tert-butylphenol.

III) Poly(N-glycidyl) compounds, obtainable by dehydrochlorination of the reaction products of epichlorohydrin with amines containing at least two amine hydrogen atoms. Such amines are, for example, aniline, n-butylamine, bis(4-aminophenyl)methane, m-xylylenediamine or bis(4-methylaminophenyl)methane.

The poly(N-glycidyl) compounds also include, however, triglycidyl isocyanurate, N,N'-diglycidyl derivatives of cycloalkyleneureas, such as ethyleneurea or 1,3-propyleneurea, and diglycidyl derivatives of hydantoins, such as of 5,5-dimethylhydantoin.

IV) Poly(S-glycidyl) compounds, for example di-S-glycidyl derivatives, derived from dithiols, e.g. ethane-1,2-dithiol or bis(4-mercaptomethylphenyl)ether.

V) Cycloaliphatic epoxy resins, e.g. bis(2,3-epoxycyclopentyl)ether, 2,3-epoxycyclopentylglycidyl ether, 1,2-bis(2,3-epoxycyclopentyloxy)ethane or 3,4-epoxycyclohexylmethyl-3',4'-epoxycyclohexanecarboxylate.

It is also possible, however, to use epoxy resins wherein the 1,2-epoxy groups are bonded to different hetero atoms or functional groups; such compounds include, for example, the N,N,O-triglycidyl derivative of 4-aminophenol, the glycidyl ether glycidyl ester of salicylic acid, N-glycidyl-N'-(2-glycidyloxypropyl)-5,5-dimethylhydantoin and 2-glycidyloxy-1,3-bis(5,5-dimethyl-1-glycidylhydantoin-3-yl)propane.

The term "cycloaliphatic epoxy resin" in the context of this invention denotes any epoxy resin having cycloaliphatic structural units, that is to say it includes both cycloaliphatic glycidyl compounds and β-methylglycidyl compounds as well as epoxy resins based on cycloalkylene oxides. "Liquid at room temperature (RT)" is to be understood as meaning pourable compounds that are liquid at 25° C., i.e. are of low to medium viscosity (viscosity less than about 20 000 mPa·s determined with a Rheomat equipment, type 115; MS DIN 125; D=11/s at 25° C.).

Suitable cycloaliphatic glycidyl compounds and β-methylglycidyl compounds are the glycidyl esters and β-methylglycidyl esters of cycloaliphatic polycarboxylic acids, such as tetrahydrophthalic acid, 4-methyltetrahydrophthalic acid, hexahydrophthalic acid, 3-methylhexahydrophthalic acid and 4-methylhexahydrophthalic acid.

Further suitable cycloaliphatic epoxy resins are the diglycidyl ethers and β-methylglycidyl ethers of cycloaliphatic alcohols, such as 1,2-dihydroxycyclohexane, 1,3-dihydroxycyclohexane and 1,4-dihydroxycyclohexane, 1,4-cyclohexanedimethanol, 1,1-bis(hydroxymethyl)cyclohex-3-ene, bis(4-hydroxycyclohexyl)methane, 2,2-bis(4-hydroxycyclohexyl)propane and bis(4-hydroxycyclohexyl)sulfone.

Examples of epoxy resins having cycloalkylene oxide structures are bis(2,3-epoxycyclopentyl)ether, 2,3-epoxycyclopentylglycidyl ether, 1,2-bis(2,3-epoxycyclopentyl)ethane, vinyl cyclohexene dioxide, 3,4-epoxycyclohexylmethyl 3',4'-epoxycyclohexanecarboxylate, 3,4-epoxy-6-methylcyclohexylmethyl-3',4'-epoxy-6'-methylcyclohexanecarboxylate, bis(3,4-epoxycyclohexylmethyl)adipate and bis(3,4-epoxy-6-methylcyclohexylmethyl)adipate.

Preferred cycloaliphatic epoxy resins are bis(4-hydroxycyclohexyl)methanediglycidyl ether, 2,2-bis(4-hydroxycyclohexyl)propanediglycidyl ether, tetrahydrophthalic acid diglycidyl ester, 4-methyltetrahydrophthalic acid diglycidyl ester, 4-methylhexahydrophthalic acid diglycidyl ester, 3,4-epoxycyclohexylmethyl 3',4'-epoxycyclohexanecarboxylate and especially hexahydrophthalic acid diglycidyl ester.

Aliphatic epoxy resins can also be used. As "aliphatic epoxy resins" it is possible to use epoxidation products of unsaturated fatty acid esters. It is preferable to use epoxy-containing compounds derived from mono- and poly-fatty acids having from 12 to 22 carbon atoms and an iodine number of from 30 to 400, for example lauroleic acid, myristoleic acid, palmitoleic acid, oleic acid, gadoleic acid, erucic acid, ricinoleic acid, linoleic acid, linolenic acid, elaidic acid, licanic acid, arachidonic acid and clupanodonic acid.

For example, suitable are the epoxidation products of soybean oil, linseed oil, perilla oil, tung oil, oiticica oil, safflower oil, poppyseed oil, hemp oil, cottonseed oil, sunflower oil, rapeseed oil, polyunsaturated triglycerides, triglycerides from euphorbia plants, groundnut oil, olive oil, olive kernel oil, almond oil, kapok oil, hazelnut oil, apricot kernel oil, beechnut oil, lupin oil, maize oil, sesame oil, grapeseed oil, lallemantia oil, castor oil, herring oil, sardine oil, menhaden oil, whale oil, tall oil and derivatives thereof.

Also suitable are higher unsaturated derivatives that can be obtained by subsequent dehydrogenation reactions of those oils.

The olefinic double bonds of the unsaturated fatty acid radicals of the above-mentioned compounds can be epoxidised in accordance with known methods, for example by reaction with hydrogen peroxide, optionally in the presence of a catalyst, an alkyl hydroperoxide or a peracid, for example performic acid or peracetic acid. Within the scope of the invention, both the fully epoxidised oils and the partially epoxidised derivatives that still contain free double bonds can be used for component a-1).

Mixtures of epoxy resins I) to V) mentioned above can also be used. Composition (A) preferably comprises an at 25° C. liquid or solid aromatic or cycloaliphatic glycidylether or glycidylether, especially preferably is the diglycidylether or diglycidylester of bisphenol A or bisphenol F. Preferred epoxy resins can also be obtained by the reaction of polyglycidylether and polyglycidylester with alcohols, such as diols. The reaction with diols increases the molecular weight.

Especially preferred is an epoxy resin which is a bisphenol A glycidylether which is reacted with less than an equimolar amount of bisphenol A.

According to a preferred embodiment composition (A) comprises an epoxy resin selected from the group consisting of polyglycidylester, poly(β-methylglycidyl)ester, polyglycidylether, poly(β-methylglycidyl)ether and mixtures thereof.

Preferably, composition (A) comprises a cycloaliphatic epoxy resin which is preferably selected from the group consisting of bis(4-hydroxycyclohexyl)methanediglycidyl ether, 2,2-bis(4-hydroxycyclohexyl)propanediglycidyl ether, tetrahydrophthalic acid diglycidyl ester, 4-methyltetrahydrophthalic acid diglycidyl ester, 4-methylhexahydrophthalic acid diglycidyl ester, 3,4-epoxycyclohexylmethyl-3',4'-epoxycyclohexanecarboxylate, and hexahydrophthalic acid diglycidyl ester.

According to a preferred embodiment composition (A) comprises one or more epoxy resin(s) in an amount ranging from 20 to 90 wt.-%, preferably from 25 to 85 wt.-% and more preferably from 30 to 75 wt.-%, wherein the weight is based on the total weight of composition (A).

Composition (A) and composition (B) comprise independently from each other at least one inorganic thixotropic agent selected from the group consisting fumed metal oxides, fumed-semi metal oxides and layered silicates. Preferably, the inorganic thixotropic agent is selected from the group consisting of fumed silica, fumed alumina, surface treated fumed silica, bentonite, montmorrilonite, surface treated bentonite and surface treated montmorrilonite.

According to a further preferred embodiment composition (A) and/or composition (B) of the curable system according to the present invention comprise(s) one or more inorganic thixotropic agents having an average particle size $d_{50}$ of less than 1 μm determined according to ISO 13320-1:1999.

$D_{50}$ is known as a medium value of particle diameter. This means that a powder comprises 50% of particles having a larger particle size and 50% of particles having a smaller particle size than the $d_{50}$ value.

According to a further preferred embodiment the inorganic thixotropic agent is surface treated fumed silica. The fumed silica is preferably surface treated with a silane, preferably selected from the group consisting of amino silane, epoxy silane, (meth)acrylic silane, methyl silane and vinyl silane.

Preferably, composition (A) comprises one or more inorganic thixotropic agents in an amount ranging from 0.1 to 5 wt.-%, preferably from 0.5 to 4 wt.-% and more preferably from 1 to 3 wt.-%, wherein the weight is based on the total weight of composition (A).

Likewise, composition (B) preferably comprises one or more inorganic thixotropic agents in an amount ranging from 0.1 to 5 wt.-%, preferably from 0.5 to 4 wt.-% and more preferably from 1 to 3 wt.-%, wherein the weight is based on the total weight of composition (B).

Composition (A) of the curable system according to the present invention additionally comprises at least one organic gelling agent. An organic gelling agent within the meaning of the present invention is a component which shows a dominant reverse temperature dependence on the thickening effect. Preferably, composition (A) comprises one or more organic gelling agent(s) selected from the group consisting of (i) a reaction product of a fatty acid selected from the group consisting of stearic acid, ricinoleic acid, oleic acid, hydroxystearic acid, erucic acid, lauric acid, ethylenebis (stearic acid) and ethylenebis(oleic acid) and a polyamine selected from the group consisting of ethylenediamine, diethylenetriamine, triethylenetetramine and polyethylenepolyamine, (ii) a castor oil wax, (iii) a sorbitol derivative selected from the group consisting of dibenzylidene-sorbitol and tribenzylidene-sorbitol which optionally have a substituent selected from the group consisting of an alkyl group having 1 to 12 carbon atoms and an alkoxy group having 1 to 6 carbon atoms on the phenyl ring and (iv) N-lauroyl-L-glutamic acid-α,γ-di-n-butyramide, Cholesterol-derivatives, amino acid derivatives, 12-hydroxy stearic acid.

According to a preferred embodiment composition (A) comprises an organic gelling agent selected from the group consisting of dibenzylidene-sorbitol and tribenzylidene-sorbitol and any mixtures thereof.

Preferably, composition (A) comprises one or more organic gelling agent(s) in an amount ranging from 0.1 to 10 wt.-%, preferably from 0.5 to 8 wt.-% and more preferably from 1 to 6 wt.-%, wherein the weight is based on the total weight of composition (A).

Both composition (A) and composition (B) of the curable system according to the present invention comprise at least 10 wt.-% of one or more filler.

Preferably, composition (A) and/or composition (B) independently from each other comprise(s) one or more filler selected from the group consisting of metal powder, wood flour, glass powder, glass beads, semi-metal oxides, metal oxides, metal hydroxides, semi-metal and metal nitrides, semi-metal and metal carbides, metal carbonates, metal sulfates, and natural or synthetic minerals.

Preferred fillers are selected from the group consisting of quartz sand, silanised quartz powder, silica, aluminium oxide, titanium oxide, zirconium oxide, $Mg(OH)_2$, $Al(OH)_3$, silanised $Al(OH)_3$, AlO(OH), silicon nitride, boron nitrides, aluminium nitride, silicon carbide, boron carbides, dolomite, chalk, $CaCO_3$, barite, gypsum, hydromagnesite, zeolites, talcum, mica, kaolin and wollastonite.

Especially preferred is wollastonite or calcium carbonate.

According to a preferred embodiment the curable system comprises composition (A) and/or composition (B) which comprise(s) one or more filler having an average particle size $d_{50}$ ranging from 1 to 300 μm, more preferably from 5 to 20 μm determined according to ISO 13320-1:1999.

According to a preferred embodiment of the present invention the curable resin system comprises the filler in an amount which is higher than 40 wt.-%, preferably higher than 45 wt.-%, more preferably higher than 50 wt.-% and most preferably higher than 60 wt.-%, wherein the weight is based on the total weight of composition (A) and composition (B).

Composition (B) comprises at least one hardener for epoxy resins. Preferably the hardener for the epoxy resin is an anhydride hardener, which is more preferably an anhydride of a polycarboxylic acid.

The anhydride hardener may be a linear aliphatic polymeric anhydrides, for example polysebacic polyanhydride or polyazelaic polyanhydride, or cyclic carboxylic anhydrides. Cyclic carboxylic anhydrides are especially preferred.

Examples of cyclic carboxylic anhydrides are:
succinic anhydride, citraconic anhydride, itaconic anhydride, alkenyl-substituted succinic anhydrides, dodecenylsuccinic anhydride, maleic anhydride and tricarballylic anhydride, a maleic anhydride adduct with cyclopentadiene or methylcyclopentadiene, a linoleic acid adduct with maleic anhydride, alkylated endoalkylenetetrahydrophthalic anhydrides, methyltetrahydrophthalic anhydride and tetrahydrophthalic anhydride, the isomeric mixtures of the two latter compounds being especially suitable.

Preferably, the hardener is an anhydride hardener which is more preferably selected from the group consisting of methyltetrahydrophtalic anhydride; methyl-4-endomethylene tetrahydrophhtalic anhydride; methylhexahydrophthalic anhydride; tetrahydrophthalic anhydride.

More preferably the anhydride hardener is a polyester anhydride which is obtainable by the reaction of a dianhydride with a less equimolar amount of diols.

Especially preferred is the reaction product of methyltetrahydrophthalic anhydride with glycoles which is commercially available under the name Araldite® HY 925 ex Huntsman, Switzerland.

Preferably, composition (B) of the curable system according to the present invention comprises one or more hardener for epoxy resins in an amount ranging from 20 to 90 wt.-%, preferably from 25 to 85 wt.-% and more preferably from 30 to 75 wt.-%, wherein the weight is based on the total weight of composition (B).

Composition (B) of the curable system additionally comprises at least one organic thixotropic agent selected from carbamates.

Within the meaning of the present invention carbamate is the general term for components having at least a urethane or a carbamide group.

The organic thixotropic agents are components which demonstrate a dominant shear dependence on the thickening effect. Suitable carbamates are carbamides which are commercially available from Byk Chemie, Germany under the tradenames BYK® 410, BYK® E 410 and BYK® 411. Especially preferred are carbamates which are urea-urethanes. Urea-urethanes can be prepared according to the German patent DE 102 41 853 B3. Further preferred are carbamides which are polymeric urea-urethanes which are commercially available as BYK® 410. Especially preferred is a carbamate which is a urea-urethane prepared by a first reaction of a diisocyanate with a polyol; wherein excess diisocyanate is used to form an isocyanate mixture comprising a doubly NCO-terminated urethane prepolymer and excess diisocyanate; and followed by a second reaction of the isocyanate mixture with an amine mixture comprising at least one primary monoamine and at least one primary diamine; wherein the amount of diamine is from 0.1 to 45 equivalents, based on 100 equivalents of the mixture of primary monoamine and primary diamine; with the proviso that after the second reaction the polymeric urea-urethane present is substantially free of isocyanate and of the monoamine and the diamine, wherein the diisocyanate, polyol, monoamine and diamine can be single components or mixtures.

The polymeric urea-urethane prepared according to Example 23 of DE 102 41 853 B3 is a especially preferred carbamide.

According to a preferred embodiment composition (B) of the curable system according to the present invention comprises one or more organic thixotropic agents in an amount ranging from 0.1 to 10 wt.-%, preferably 0.5 to 8 wt.-% and more preferably from 1 to 6 wt.-%, wherein the weight is based on the total weight of composition (B).

Composition (A) and/or composition (B) preferably have a storage modulus G' which is higher than the loss modulus G" determined at 25° C. and a frequency lower than 0.1 Hz and carried out with a TA instrument AR-G2 (controlled stress Rheometer) according to ISO 6721-10.

Further preferred is a curable system wherein the mixture of composition (A) and composition (B) in a mixing ratio of 1:1 by volume has a value for the storage modulus G' which is less than 20%, preferably less than 10% different from the value for the loss modulus both determined at 25° C. and a frequency of 10 Hz with a TA instrument AR-G2 (controlled stress Rheometer) according to ISO 6721-10.

According to a preferred embodiment the curable system of the present invention comprises composition (A) and composition (B) in a volume ratio of 1:10 to 10:1, preferably 9:1 to 1:9, more preferably 7:3 to 3:7 and most preferably 6:4 to 4:6.

Preferably, composition (B) may additionally comprise a curing accelerator.

The compositions according to the invention optionally comprise a curing accelerator as additional component. Suitable accelerators are known to the person skilled in the art. Examples that may be mentioned are:
complexes of amines, especially tertiary amines, with boron trichloride or boron trifluoride;
tertiary amines, such as benzyldimethylamine;
urea derivatives, such as N-4-chlorophenyl-N',N'-dimethylurea (monuron);
unsubstituted or substituted imidazoles, such as imidazole or 2-phenylimidazole.

Preferred accelerators are tertiary amines, especially benzyldimethylamine, and imidazoles (e.g. 1-methylimidazole).

The curing accelerators are usually used in amounts of from 0.1 to 20 parts by weight per 100 parts by weight of epoxy resin(s).

Composition (A) and/or composition (B) may additionally comprise further additives, such as flexibilizer, anti settling agents, color agents, defoamer, light stabilizer, mold release agents, toughening agents, adhesion promoter and flame retardants.

A further embodiment of the present invention is a method for the manufacturing of a cured product comprising the steps:
- a) preparing a mixture comprising composition (A) and composition (B) of the curable system according to the present invention, and
- b) at least partly curing the mixture obtained in step a).

Preferably, the mixture prepared in step a) is applied to, more preferably injected into, a preheated form.

According to a preferred embodiment the method according to the present invention comprises the steps:
- a) preparing a mixture comprising composition (A) and composition (B) of the curable system according to the present invention,
- b) injecting the mixture into a preheated form having a temperature ranging from 120 to 170° C.,
- c) at least partly curing the mixture
- d) removing the form and
- e) optionally post curing the partly cured mixture.

The preheated form preferably has a temperature ranging from 130 to 160° C. It is further preferred that the mixture prepared in step a) is heat cured, preferably at a temperature ranging from 130 to 160° C. In general, the mixture prepared in step a) is cured for at least 10 minutes, preferably 10 to 60 minutes.

A further advantage of the method according to the present invention is that composition (A) as well as composition (B) are sedimentation stable and, as a consequence, it is not necessary to homogenize said composition by stirring which would subsequently need a degassing step.

Therefore, preferably the method according to the present invention does not comprise a degassing step.

The method according to the present invention is preferably used to prepare electrical insulator. Therefore, according to a preferred embodiment the cured product is an electrical insulator.

A further embodiment of the present invention is a cured product, preferably an electrical insulator, obtainable by a method according to the present invention.

A further embodiment of the present invention is the use of the cured product according to the present invention as an electrical insulator.

The curable system according to the present invention is preferably applied in the field of the manufacture of components or parts of electrical equipment. Therefore, a further embodiment of the present invention is the use of the curable system according to the present invention for the manufacture of components or parts of electrical equipment, preferably the use for the manufacturing of electrical insulators.

EXAMPLES

TABLE 1

Raw materials used in the Examples

| Component | Description |
| --- | --- |
| Araldite ® CY 225 | Modified solvent free, medium viscous bisphenol A epoxy resin with an Epoxy equivalent of 5.1-5.3 eq/kg Supplier: Huntsman, Switzerland |
| Dynasylan ® GLYMO | (3-glycidyloxypropyl-trimethoxysilane) gamma-glycydoxypropyltrimethoxysilane Supplier: HUELS |

TABLE 1-continued

Raw materials used in the Examples

| Component | Description |
| --- | --- |
| BYK ® A 501 | mixture of 50 parts solvent nafta; 43 parts silicone free foam destroying polymers and 7 parts 1-methoxy-2-propylacetate liquid degassing agent Supplier: BYK Chemie; Germany |
| BYK ® 410 | Polymeric urea urethane Supplier: BKY Chemie; Germany |
| Aerosil ® R 202 | Hydrophobic fumed silica aftertreated with a polydimethylsiloxane Supplier: Evonic Degussa, Germany |
| Bayferrox ® 316F | Pigment black $Fe_3O_4$ Supplier: LANXESS, Germany |
| Bayferrox ® 645T | mixed phase pigment $Fe_2O_3$ and $Mn_2O_3$ Supplier: LANXESS, Germany |
| Wollastonite | Calciummetasilicate($Ca_3Si_3O_9$)) with the following specification: particle size $d_{50}$ of 9-16 microns <45 microns 84 ± 5 weight % <4 microns 26-36 weight % <2 microns <28 weight % Bulk Density 0.88-0.97 g/cm³ Brightness, Ry >85% L/D ratio: 3:1 Supplier: Nordkalk, Finnland |
| Irgaclear ® D | (Geniset D; DBS dibenzylidene sorbitol) gelling agent Supplier: CIBA |
| Aradur ® HY 225 | Liquid, flexibilized, pre-accelerated anhydride curing agent mainly based on methyltetrahydrophthalic anhydride Supplier: Huntsman, Switzerland |
| Aradur ® HY 918 | Liquid, anhydride curing agent based on methyltetrahydrophthalic anhydride Supplier: Huntsman, Switzerland |
| Aradur ® HY 925 | Liquid, flexibilized, pre-accelerated anhydride curing agent mainly based on methyltetrahydrophthalic anhydride Supplier: Huntsman, Switzerland |
| Accelerator DY 070 | 1-methyl-imidazole; accelerator Supplier: Huntsman, Switzerland |
| Millisil ® W12 | Silica Flour Supplier: Quarzwerke, Germany |
| Socal ® U1S2 | Calcium carbonate Supplier: Solvay (Brenntag); Switzerland |

Comparative Example 1

Curable System Comprising Composition R1 and H1

Preparation of Composition R1

A 2.5 l heatable ESCO® mixer apparatus equipped with dissolver, anchor agitator and a vacuum pump is charged with 419.5 g epoxy resin (Araldite® CY 225), 2.0 g Aerosil® R 202, 2.0 g Dynasylan® GLYMO, 1.0 g BYK® A 501, 3.0 g Bayferrox® 316 F and 7.0 g Bayferrox® 645 T. The components are mixed for 30 min while heating up to 60° C. and stirring at 100 rpm under reduced pressure (10 mbar). Subsequently, 565.5 g of Wollastonite is added in portions while stirring at 100 rpm followed by using the dissolver at 3000 rpm for about 5 minutes. Finally, the mixture is stirred at 100 rpm for 30 min under reduced pressure (10 mbar) at 60° C.

Preparation of Composition H1

A 2.5 l heatable ESCO® mixer apparatus equipped with dissolver, anchor agitator and a vacuum pump is charged with 354.6 g anhydride hardener (Aradur® HY 925), 2.0 g Aerosil® R 202 and 1.0 g BYK® A 501. The components are mixed for 30 min while heating up to 50° C. and stirring at 100 rpm under reduced pressure (10 mbar). Subsequently, 598.2 g of Wollastonite and 44.2 g Socal® U1S2 are added in portions while stirring at 100 rpm followed by using the dissolver at 3000 rpm for about 5 minutes. Finally, the mixture is stirred at 100 rpm for 30 min under reduced pressure (10 mbar) at 50° C.

Comparative Example 2

Curable System Comprising Composition R2 and H2

Preparation of Composition R2

A 2.5 l heatable ESCO® mixer apparatus equipped with dissolver, anchor agitator and a vacuum pump is charged with 388.8 g epoxy resin (Araldite® CY 225), 2.0 g Aerosil® R 202, 2.0 g Dynasylan® GLYMO, 1.0 g BYK® A 501, 3.0 g Bayferrox® 316 F and 7.0 g Bayferrox® 645 T. The components are mixed for 30 min while heating up to 60° C. and stirring at 100 rpm under reduced pressure (10 mbar). Subsequently, 596.2 g of Wollastonite is added in portions while stirring at 100 rpm followed by using the dissolver at 3000 rpm for about 5 minutes. Finally, the mixture is stirred at 100 rpm for 30 min under reduced pressure (10 mbar) at 60° C.

Preparation of Composition H2

A 2.5 l heatable ESCO® mixer apparatus equipped with dissolver, anchor agitator and a vacuum pump is charged with 180.0 g anhydride hardener (Aradur®) HY 225) 140.0 g Aradur® HY 918, 2.17 g Accelerator DY 070, 3.0 g Aerosil® R 202, 1.0 g BYK® A 501 and 1.0 g of BYK® 410. The components are mixed for 30 min while heating up to 50° C. and stirring at 100 rpm under reduced pressure (10 mbar). Subsequently, 672.83 g of Wollastonite is added in portions while stirring at 100 rpm followed by using the dissolver at 3000 rpm for about 5 minutes. Finally, the mixture is stirred at 100 rpm for 30 min under reduced pressure (10 mbar) at 50° C.

Comparative Example 3

Curable System Comprising Composition R3 and H3

Preparation of Composition R3

A 2.5 l heatable ESCO® mixer apparatus equipped with dissolver, anchor agitator and a vacuum pump is charged with 388.8 g epoxy resin (Araldite® CY 225), 10.0 g Aerosil® R 202, 2.0 g Dynasylan® GLYMO, 1.0 g BYK® A 501, 5.0 g of BYK® 410, 3.0 g Bayferrox® 316 F and 7.0 g Bayferrox® 645 T. The components are mixed for 30 min while heating up to 60° C. and stirring at 100 rpm under reduced pressure (10 mbar). Subsequently, 583.2 g of Wollastonite is added in portions while stirring at 100 rpm followed by using the dissolver at 3000 rpm for about 5 minutes. Finally, the mixture is stirred at 100 rpm for 30 min under reduced pressure (10 mbar) at 60° C.

Preparation of Composition H3

A 2.5 l heatable ESCO® mixer apparatus equipped with dissolver, anchor agitator and a vacuum pump is charged with 180.0 g anhydride hardener (Aradur®) HY 225), 140.0 g Aradur® HY 918, 2.17 g Accelerator DY 070, 10.0 g Aerosil® R 202, 1.0 g BYK® A 501 and 5.0 g of BYK® 410. The components are mixed for 30 min while heating up to 50° C. and stirring at 100 rpm under reduced pressure (10 mbar). Subsequently, 661.83 g of Wollastonite is added in portions while stirring at 100 rpm followed by using the dissolver at 3000 rpm for about 5 minutes. Finally, the mixture is stirred at 100 rpm for 30 min under reduced pressure (10 mbar) at 50° C.

Example According to the Invention

Curable System According to the Invention Comprising Composition A1 and Composition B1

Preparation of Composition A1

A 2.5 l heatable ESCO® mixer apparatus equipped with dissolver, anchor agitator and a vacuum pump is charged with 260.0 g epoxy resin (Araldite® CY 225) and is heated up to 110° C. while stirring (100 rpm). At 110° C. 2.7 g Irgaclear D® is added to the resin and the mixture is stirred for 2 h at 110° C. After getting a clear solution 128.8 g of epoxy resin (Araldite® CY 225) is added, the mixture is cooled down to 65° C. and 2.0 g Aerosil R 202, 2.0 g Dynasylan® GLYMO, 1.0 g BYK® A 501, 3.0 g Bayferrox® 316 F and 7.0 g Bayferrox® 645 T are charged in addition to the vessel. The mixture is stirred at 100 rpm for 15 min at 60° C. under reduced pressure (10 mbar). Subsequently, 593.5 g of Wollastonite is added in portions while stirring at 100 rpm followed by using the dissolver at 3000 rpm for about 5 minutes. Finally, the mixture is stirred at 100 rpm for 30 min under reduced pressure (10 mbar) at 60° C.

Preparation of Composition B1

A 2.5 l heatable ESCO® mixer apparatus equipped with dissolver, anchor agitator and a vacuum pump is charged with 140.0 g anhydride hardener (Aradur® HY 225) 180.0 g Aradur® HY 918, 2.17 g Accelerator DY 070, 15.0 g Aerosil® R 202, 1.0 g BYK® A 501 and 5.0 g BYK® 410. The mixture is stirred at 100 rpm for 30 min at 50° C. under reduced pressure (10 mbar). Subsequently, 656.83 g of Wollastonite is added in portions while stirring at 100 rpm followed by using the dissolver at 3000 rpm for about 5 minutes. Finally, the mixture is stirred at 100 rpm for 30 min under reduced pressure (10 mbar) at 50° C.

The amounts referred to in the tables which follow are given in parts by weight.

TABLE 2a

| | Curable systems according to the comparative Examples | | | | | |
|---|---|---|---|---|---|---|
| | Comparative Example 1 Curable systems comprising R1 and H1 | | Comparative Example 2 Curable systems comprising R2 and H2 | | Comparative Example 3 Curable systems comprising R3 and H3 | |
| Component | Resin Composition R1 | Hardener Composition H1 | Resin Composition R2 | Hardener Composition H2 | Resin Composition R3 | Hardener Composition H3 |
| epoxy resin (Araldite ® CY 225) | 419.5 | | 388.8 | | 388.8 | |
| hardener (Aradur ® HY 925) | | 354.6 | | | | |

TABLE 2a-continued

Curable systems according to the comparative Examples

| Component | Comparative Example 1 Curable systems comprising R1 and H1 | | Comparative Example 2 Curable systems comprising R2 and H2 | | Comparative Example 3 Curable systems comprising R3 and H3 | |
|---|---|---|---|---|---|---|
| | Resin Composition R1 | Hardener Composition H1 | Resin Composition R2 | Hardener Composition H2 | Resin Composition R3 | Hardener Composition H3 |
| hardener (Aradur ® HY 225) | | | | 180.0 | | 180.0 |
| Aerosil ® R 202 | 2.0 | 2.0 | 2.0 | 3.0 | 10.0 | 10.0 |
| Dynasylan ® GLYMO | 2.0 | — | 2.0 | — | 2.0 | — |
| BYK ® A 501 | 1.0 | 1.0 | 1.0 | 1.0 | 1.0 | 1.0 |
| Bayferrox ® 316 F | 3.0 | — | 3.0 | — | 3.0 | — |
| Bayferrox ® 645 T | 7.0 | — | 7.0 | — | 7.0 | — |
| Wollastonite | 565.5 | 598.2 | 596.2 | 672.83 | 583.2 | 661.83 |
| Socal ® U1S2 | — | 44.2 | — | — | — | — |
| Aradur ® HY 918 | — | — | — | 140.0 | — | 140.0 |
| Accelerator DY 070 | — | — | — | 2.17 | — | 2.17 |
| BYK ® 410 | — | — | — | 1.0 | 5.0 | 5.0 |

TABLE 2b

Curable system according to the invention

| Component | Curable system according to the invention comprising A1 and B1 | |
|---|---|---|
| | Composition A1 | Composition B1 |
| epoxy resin (Araldite ® CY 225) | 388.8 | |
| hardener (Aradur ® HY225) | | 140.0 |
| Aerosil ® R 202 | 2.0 | 15.0 |
| Dynasylan ® GLYMO | 2.0 | — |
| BYK ® A 501 | 1.0 | 1.0 |
| Bayferrox ® 316 F | 3.0 | — |
| Bayferrox ® 645 T | 7.0 | — |
| Wollastonite | 593.5 | 656.83 |
| Aradur ® HY 918 | — | 180.0 |
| Accelerator DY 070 | — | 2.17 |
| Irgaclear ® D | 2.7 | — |
| BYK ® 410 | — | 5.0 |

Comparative Example 4

Curable system comprising separately the following components:
R4: epoxy resin (Araldite® CY 225)
H4: Aradur® HY 925 and
F4: Millisil® W12
Prior to curing the curable system the components are mixed in the amounts which follow:
100 parts by weight of R4
80 parts by weight of H4 and
270 parts by weight of F4

Preparation of Cured Products

I) Preparation of a cured product (C2) on basis of comparative Example 4 by the following steps:
1. Drying the silica in an oven at 100° C.
2. Transfer the epoxy resin R4 into a mixer for the resin and hardener H4 into a separate mixer for the hardener
3. Heating up resin R4 and hardener H4 to about 40° C.
4. Addition of dried silica to the resin R4 and hardener H4
5. Mixing resin R4 and silica as well as hardener H4 and silica at 50° C. and a pressure of 5 mbar for 2 hours
6. Combining of resin R4 and filler and hardener H4 and filler
7. Mixing the combined mixture at 50° C. and 5 mbar
8. Transfer the mixture to a pressure pot
9. Inject from pressure pot to mold (T=140° C.)
10. Keep material in the mold for 20 min.
11. Open mold, take out the part
12. Put part to an oven at 140° C. for 10 hours II) General procedure for preparing the cured products C1 and C3 on basis of comparative Example 1 and comparative Example 3 by the following steps:

1. Pre-heating the composition comprising the epoxy resin and the composition comprising the hardener in supply containers for 10 hours at 40 to 50° C.
2. Combining the two compositions and transferring the mixture into a mixer
3. Mixing the mixture at 5 mbar for 1 hour
4. Transfer the mixture to a pressure pot
5. Inject from pressure pot to mold (T=140° C.)
6. Keep the mixture in the mold for 20 min.
7. Open mold, take out the part
8. Put part to an oven at 140° C. for 10 hours III) Process for the preparation of the cured product (C4) according to the invention on basis of the curable system according to the Example of the invention 1. Take container of composition A1 and composition B1 as supplied and use a standard two component dosing and metering equipment; supplied by equipment manufactures like DOPAG, 2KM, Rheinhard Tech and others.
2. Pump out composition A1 and composition B1 at 25° C. at the same flow rate through a static mixer into a mold (T=140° C.)
3. Keep the mixture in the mold for 20 min.
4. Open mold, take out the finished part

TABLE 3

Comparison of properties of cured systems

|  | C1<br>Cured curable system according to Comparative Example 1 (mixing ratio by weight of R1 to H1 is 1:1) | C2<br>Cured curable system according to Comparative Example 4 (non-prefilled system) | C3<br>Cured curable system according to Comparative Example 3 (mixing ratio by volume of R3 to H3 is 1:1) | C4<br>Cured curable system according to the invention (mixing ratio by volume of A1 to B1 is 1:1) |
|---|---|---|---|---|
| Viscosity at 60° C. [1] Mixture | 2000 mPas | 7000 mPas | 9100 mPas | 10500 mPas |
| Geltime at 100° C. [2] | 70 min | 70 min | 23 min | 25 min |
| Glass transition temperature (DSC) [3] | 110-120° C. | 105-125° C. | 105-115° C. | 105-120° C. |
| Flexural Strength [4] | 125 MPa | 117 MPa | 115 MPa | 115 MPa |
| Surface strain [5] | 1.3% | 1.4% | 1.1% | 1.2% |
| E-Modulus from tensile test [6] | 11000 MPa | 10500 MPa | 10500 MPa | 11000 MPa |
| Tensile strength [7] | 85 MPa | 75 MPa | 75 MPa | 80 MPa |
| Elongation at break [8] | 1.4% | 1.2% | 0.9% | 0.9% |
| Critical stress intensity factor $K_{1C}$ [9] | 2.9 MPa | 1.9 MPa | 2.8 MPa | 3.0 MPa |
| Specific energy at break $G_{1C}$ [10] | 710 J/m² | 325 J/m² | 600 J/m² | 715 J/m² |

[1] determined at 60° C. with a Rheomat equipment (type 115, MS DIN 125; D = 10 1/s)
[2] determined according to ISO 9396 measured with Gelnorm Instruments
[3] determined according to ISO 11357-2
[4] determined according to ISO 178, dimension of test specimen: 80 × 10 × 4 mm; testing speed: 2.00 mm/min
[5] determined according to ISO 178, dimension of test specimen: 80 × 10 × 4 mm; testing speed: 2.00 mm/min
[6] determined according to ISO 178, dimension of test specimen: 80 × 10 × 4 mm; testing speed: 2.00 mm/min
[7] according to ISO 527-1 (1993), test specimen type B (190 × 20.5 × 4 mm); testing speed: 1.00 mm/min
[8] according to ISO 527-1 (1993), test specimen type B (190 × 20.5 × 4 mm); testing speed: 1.00 mm/min
[9], [10] fracture toughness expressed in $K_{1C}$ and $G_{1C}$ values, determined according to PM 216, dimension of test species: 80 × 34 × 4 mm; testing speed: 0.50 mm/min Sedimentation Stability In order to determine the sedimentation stability of the compositions used to build up a curable system the storage modulus (G') and loss modulus (G") has been measured in a frequency range from 0.01 Hz to 10 Hz at 25° C. The measurement has been carried out with a TA Instrument AR-G2 (controlled stress rheometer) in a frequency range from 0.01 Hz to 10 Hz at 25° C. according to ISO 6721-10.

A good storage stability/sedimentation stability has been observed if at a frequency lower than 0.1 Hz the storage modulus (G') is higher than the loss modulus (G").

A storage modulus which is almost equal to the loss modulus at a frequency higher than 10 Hz indicates a good pumping behavior of the composition.

Figure 1:
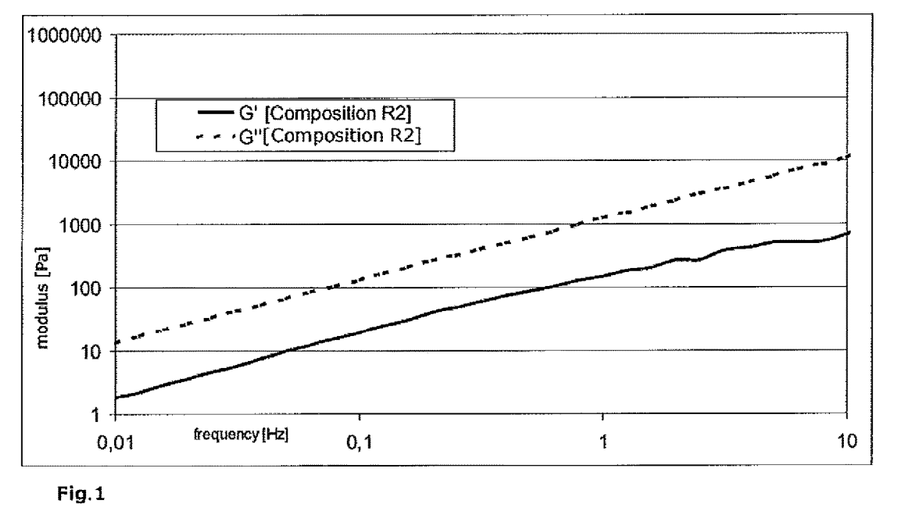
FIG. 1 depicts the storage modulus and loss modulus of composition R2 of comparative Example 2.

FIG. 1 shows the storage modulus as well as the loss modulus of composition R2 of comparative Example 2.

In the range from 0.01 to 10 Hz the storage modulus is lower than the loss modulus which indicates that composition R2 is not storage stable/sedimentation stable.

Figure 2:
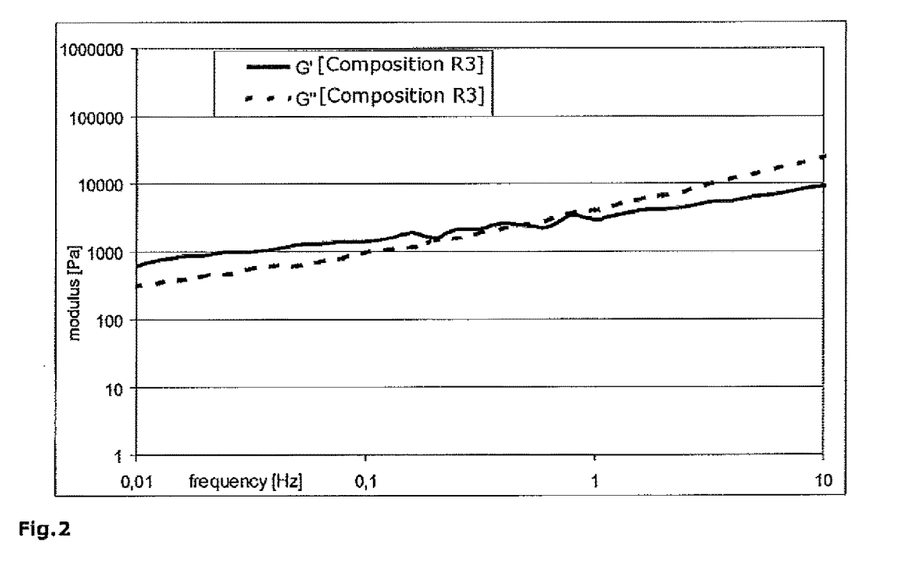
FIG. 2 depicts the storage modulus and loss modulus of composition R3 of comparative Example 3.

FIG. 2 shows the storage modulus as well as the loss modulus of composition R3 of comparative Example 3.

At a frequency lower than 0.1 Hz the storage modulus is higher than the loss modulus which indicates that composition R3 is storage stable/sedimentation stable.

Figure 3:
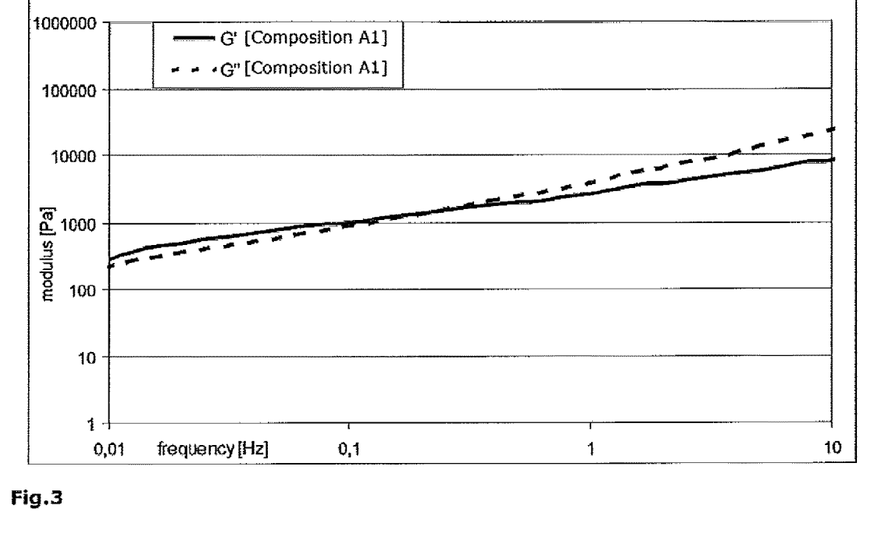
FIG. 3 depicts the storage modulus and loss modulus of composition A1 of a curable system according to the present disclosure.

FIG. 3 shows the storage modulus as well as the loss modulus of composition A1 of the curable system according to the invention. At a frequency lower than 0.1 Hz the storage modulus is higher than the loss modulus which indicates that composition A1 is storage stable/sedimentation stable. Further, for a frequency higher than 10 Hz the storage modulus is almost equal to the loss modulus which indicates that composition A1 is pumpable.

Figure 4:
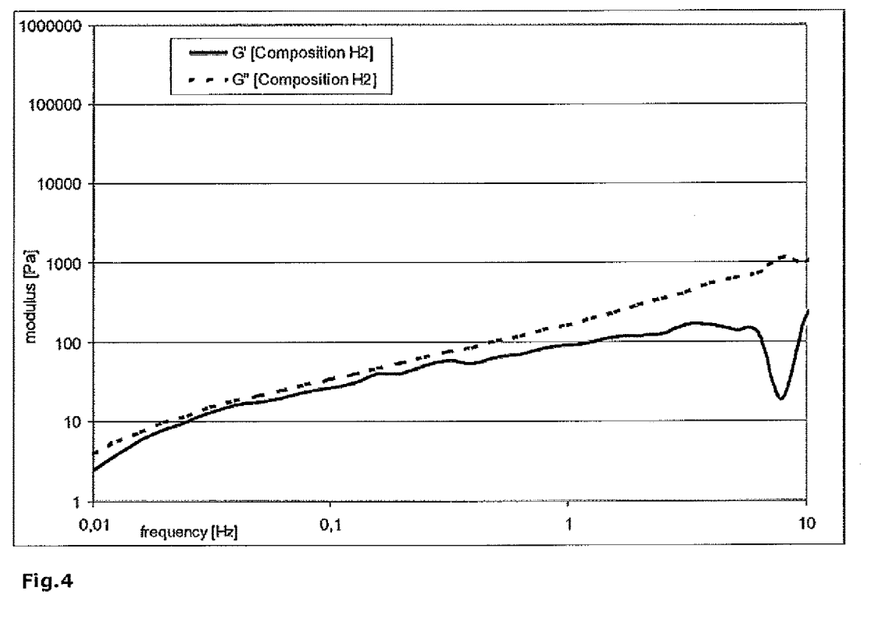
FIG. 4 depicts the storage modulus and loss modulus of composition H2 of comparative Example 2.

FIG. 4 shows the storage modulus as well as the loss modulus of composition H2.

In the frequency range of 0.01 to 10 Hz the storage modulus is lower than the loss modulus which indicates that the composition H2 is not storage stable/sedimentation stable.

Figure 5:
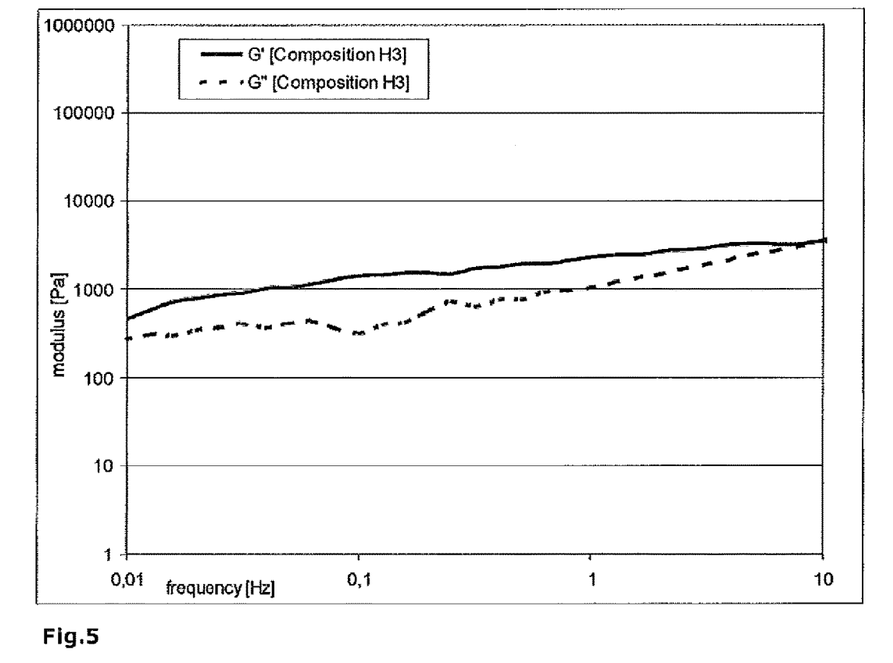
FIG. 5 depicts the storage modulus and loss modulus of composition H3 of comparative Example 3.

FIG. 5 shows the storage modulus as well as the loss modulus of composition H3 of the comparative Example 3.

At a frequency lower than 0.1 Hz the storage modulus is higher than the loss modulus which indicates that composition H3 is storage stable/sedimentation stable.

Figure 6:
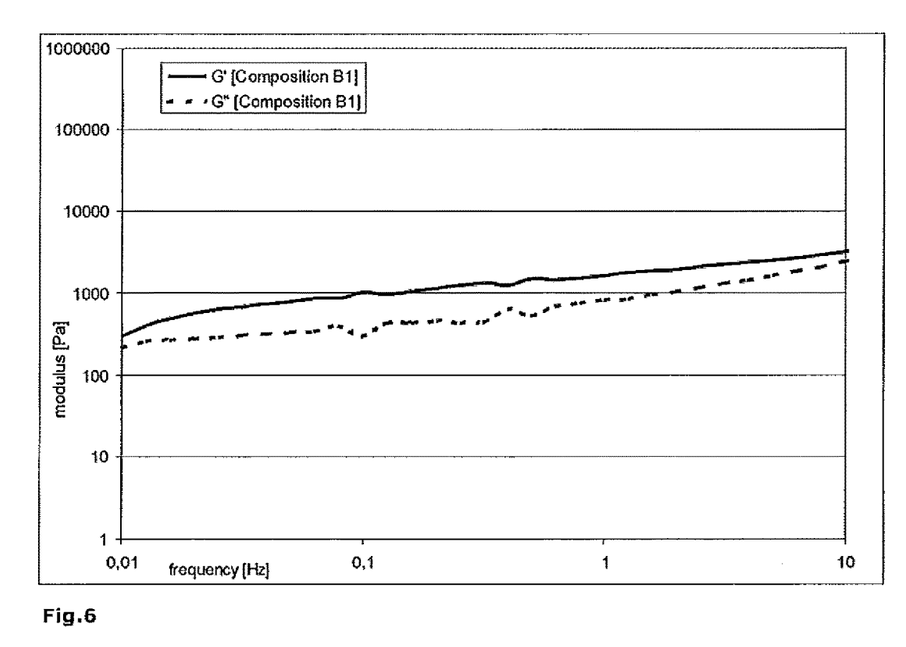
FIG. 6 depicts the storage modulus and loss modulus of composition B1 of a curable system according to the present disclosure.

FIG. 6 shows the storage modulus as well as the loss modulus of composition B1 of the curable system according to the invention.

In the frequency range lower than 0.1 Hz the storage modulus is higher than the loss modulus which indicates that composition B1 is storage stable/sedimentation stable. Further, at a frequency higher than 10 Hz the storage modulus is almost equal to the loss modulus which indicates that the composition B1 is pumpable.

Figure 7:
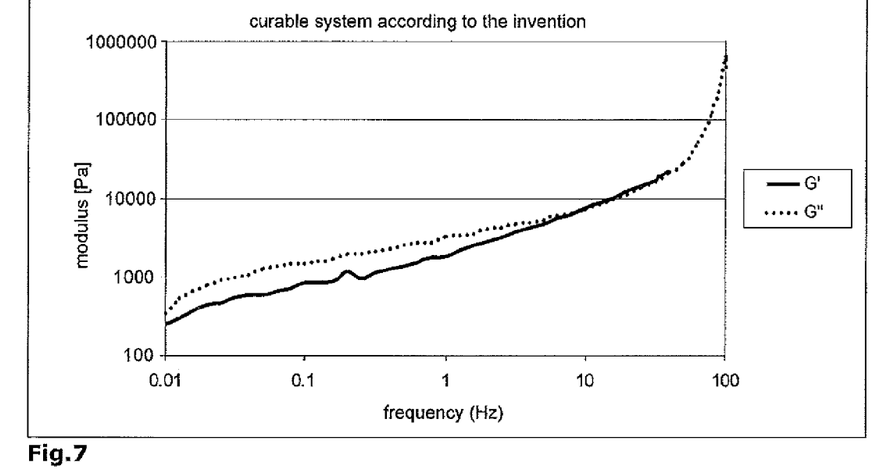
FIG. 7 depicts the storage modulus and loss modulus of a mixture of A1 and B1.

FIG. 7 shows the storage modulus as well as the loss modulus of the mixture of composition A1 and composition B1 (mixing ratio by volume is 1:1).

At a frequency higher than 10 Hz the storage modulus is almost equal to the loss modulus which indicates a good pumping behavior.

Flowability

Figure 8:
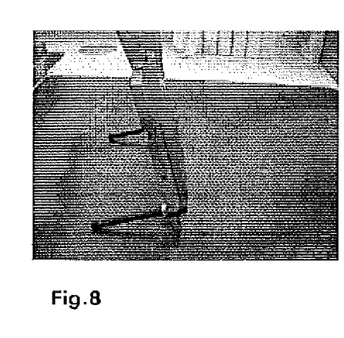
FIGS. 8 and 9 depicts plates assembled with two martens mold.
Figure 9:
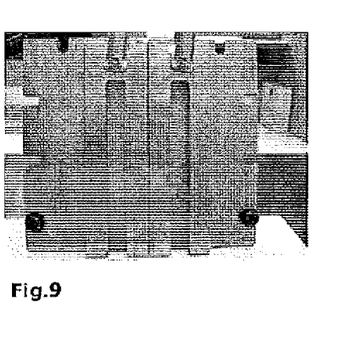

In order to determine the flowability of the curable systems the following test has been carried out:

A plate is assembled with two martens molds (FIGS. 8 and 9). The plate is heated up to 80° C. and 5 g of the test specimen having a temperature of 40° C. are applied with an injection at the closed end of the martens mold. Subsequently, the mold is turned up with an angle of 78° (see FIG. 8). After one minute the form is placed horizontal in the oven for curing 30 minutes at 140° C.

Figure 10:
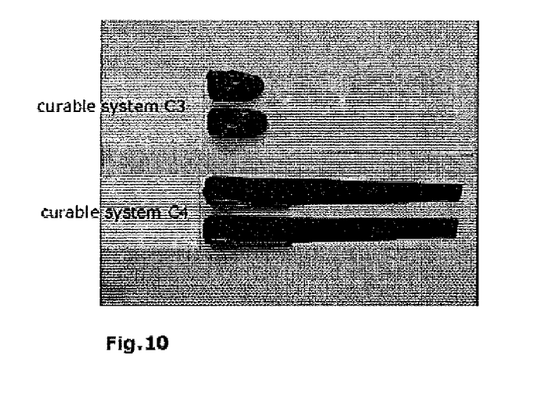
FIG. 10 depicts the flow behavior of the curable systems C3 and C4.

FIG. 10 shows the flow behaviour of the curable system according to comparative Example 3 (curable system C3) as well as the flow behaviour of the curable system C4.

It can be seen that under the same conditions the curable system C4 according to the present invention demonstrate a better flowability than the curable system C3 (not according to the invention).

TABLE 4

Flowability and sedimentation stability of curable systems

| System | Viscosity[1] | Average viscosity of the hardener composition and the epoxy resin composition | Difference[3] in % | Sedimentation[4] stability | Flowability[5] |
|---|---|---|---|---|---|
| System C5[2] | 4.8 Pas | 4.7 Pas | 2% more | bad | good |
| System C3 | 9.0 Pas | 21.9 Pas | 59% less | good | bad |
| System C4 according to the invention | 10.0 Pas | 17.3 Pas | 42% less | good | good |

[1] determined at 60° C. with a Rheomat equipment (type 115, MS DIN 125; D = 10 s$^{-1}$)
[2] mixture of composition H2 and R2 with a mixing ratio by volume of 1:1
[3] difference between the curable system and the average viscosity of the hardener composition and the epoxy resin composition
[4] sedimentation stability was determind by G' and G" measures as explained before.
[5] The flowabilty has been determined as mentioned before.

Even though the viscosity of system C4 according to the invention compared to comparative Example 3 (system C3) demonstrates a viscosity at 60° C. which is almost the same of the results obtained for the flowability are significantly different (see FIG. 10).

What is claimed is:

1. Curable system comprising at least two compositions (A) and (B) wherein composition (A) comprises:
    a-1) at least one epoxy resin,
    a-2) at least one inorganic thixotropic agent selected from the group consisting of fumed metal oxides and fumed semi-metal oxides,
    a-3) at least one organic gelling agent and
    a-4) at least 10 wt.-% of one or more filler, wherein the weight is based on the total weight of composition (A); and wherein composition (B) comprises:
    b-1) at least one hardener for epoxy resins,
    b-2) at least one inorganic thixotropic agent selected from the group consisting of fumed metal oxides and fumed semi-metal oxides,
    b-3) at least one organic thixotropic agent selected from carbamates and
    b-4) at least 10 wt.-% of one or more filler, wherein the weight is based on the total weight of composition (B) and wherein the viscosity of a 1:1 volume ratio mixture of compositions (A) and (B) is less than the than average viscosity of composition (A) and composition (B) as determined at 60° C. with a Rheomat equipment (type 115, MS DIN 125; D=10 s$^{-1}$).

2. Curable system according to claim 1 wherein composition (A) comprises one or more inorganic thixotropic agent(s) in an amount ranging from 0.1 to 5 wt.-%, wherein the weight is based on the total weight of composition (A).

3. Curable system according to claim 1 wherein composition (B) comprises one or more inorganic thixotropic agent(s) in an amount ranging from 0.1 to 5 wt.-%, wherein the weight is based on the total weight of composition (B).

4. Curable system according to claim 1 wherein composition (A) comprises one or more gelling agent(s) in an amount ranging from 0.1 to 10 wt.-%, wherein the weight is based on the total weight of composition (A).

5. Curable system according to claim 1 wherein composition (B) comprises one or more organic thixotropic agent(s) in an amount ranging from 0.1 to 10 wt.-%, wherein the weight is based on the total weight of composition (B).

6. Curable system according to claim 1 wherein composition (A) and/or composition (B) comprises one or more filler, selected from the group consisting of quartz sand, silanised quartz powder, silica, aluminium oxide, titanium oxide, zirconium oxide, $Mg(OH)_2$, $Al(OH)_3$, silanised $Al(OH)_3$, AlO(OH), silicon nitride, boron nitrides, aluminium nitride, silicon carbide, boron carbides, dolomite, chalk, $CaCO_3$, barite, gypsum, hydromagnesite, zeolites, talcum, mica, kaolin and wollastonite.

7. Curable system according to claim 1 wherein composition (A) comprises a organic gelling agent selected from the group consisting of dibenzylidene-sorbitol and tribenzylidene-sorbitol.

8. Curable system according to claim 1 wherein the organic thixotropic agent is a carbamate which is a polymeric urea-urethane prepared by a first reaction of a diisocyanate with a polyol; wherein excess diisocyanate is used to form an isocyanate mixture comprising a doubly NCO-terminated urethane prepolymer and excess diisocyanate; and followed by a second reaction of the isocyanate mixture with an amine mixture comprising at least one primary monoamine and at least one primary diamine; wherein the amount of diamine is from 0.1 to 45 equivalents, based on 100 equivalents of the mixture of primary monoamine and primary diamine; with the proviso that after the second reaction the polymeric urea-urethane present is substantially free of isocyanate and of the monoamine and the diamine, wherein the diisocyanate, polyol, monoamine and diamine can be single components or mixtures.

9. Method for the manufacturing of a cured product comprising the steps:
    a) preparing a mixture comprising composition (A) and composition (B) of the curable system as defined in claim 1 and
    b) at least partly curing the mixture obtained in step a).

10. Method according to claim 9, wherein the method does not comprise a degassing step.

* * * * *